(12) United States Patent
Alev et al.

(10) Patent No.: US 8,856,230 B2
(45) Date of Patent: Oct. 7, 2014

(54) IN BROWSER REAL TIME COLLABORATION LISTS AND FORMS

(75) Inventors: Umut Alev, Mercer Island, WA (US); Rafiq El Alami, Kirkland, WA (US); Juan Lopez Velasquez, Bellevue, WA (US); Amy Glaves, Marysville, WA (US)

(73) Assignee: Microsoft Corporation, Redmond, WA (US)

(*) Notice: Subject to any disclaimer, the term of this patent is extended or adjusted under 35 U.S.C. 154(b) by 153 days.

(21) Appl. No.: 12/967,459

(22) Filed: Dec. 14, 2010

(65) Prior Publication Data

US 2012/0150942 A1 Jun. 14, 2012

(51) Int. Cl.
  *G06F 15/16* (2006.01)
  *G06F 15/173* (2006.01)
  *G06Q 10/10* (2012.01)

(52) U.S. Cl.
  CPC .................................. *G06Q 10/101* (2013.01)
  USPC ............................ 709/204; 709/203; 709/238

(58) Field of Classification Search
  USPC .................................................. 709/213, 238
  See application file for complete search history.

(56) References Cited

U.S. PATENT DOCUMENTS

| | | | |
|---|---|---|---|
| 6,212,192 B1 | 4/2001 | Mirashrafi et al. | |
| 6,252,944 B1* | 6/2001 | Hansen et al. | 379/67.1 |
| 6,342,906 B1 | 1/2002 | Kumar et al. | |
| 6,983,416 B1 | 1/2006 | Bae et al. | |
| 7,249,314 B2 | 7/2007 | Walker et al. | |
| 7,702,730 B2* | 4/2010 | Spataro et al. | 709/205 |
| 8,112,789 B2* | 2/2012 | Halls et al. | 726/4 |
| 2002/0016858 A1* | 2/2002 | Sawada et al. | 709/238 |
| 2006/0026502 A1* | 2/2006 | Dutta | 715/511 |
| 2006/0053380 A1* | 3/2006 | Spataro et al. | 715/753 |
| 2007/0185956 A1* | 8/2007 | Ogle et al. | 709/204 |
| 2008/0155104 A1* | 6/2008 | Quinn et al. | 709/227 |
| 2008/0189162 A1* | 8/2008 | Ganong et al. | 705/9 |
| 2008/0209330 A1* | 8/2008 | Cruver | 715/733 |
| 2009/0077170 A1* | 3/2009 | Milburn et al. | 709/203 |
| 2009/0100154 A1* | 4/2009 | Stevenson et al. | 709/220 |
| 2009/0187830 A1 | 7/2009 | Jorasch et al. | |
| 2009/0187936 A1* | 7/2009 | Parekh et al. | 725/25 |
| 2009/0282462 A1 | 11/2009 | Skaria et al. | |
| 2009/0327294 A1 | 12/2009 | Bailor et al. | |
| 2010/0083136 A1 | 4/2010 | Komine et al. | |

(Continued)

OTHER PUBLICATIONS

Allen, Will., "Real-time collaborative writing with Google Docs", Retrieved at << http://web2practice.jiscinvolve.org/wp/2010/04/22/real-time-collaborative-writing-with-google-docs >>, Apr. 22, 2010, pp. 5.

(Continued)

*Primary Examiner* — Emmanuel L Moise
*Assistant Examiner* — Mahran Abu Roumi
(74) *Attorney, Agent, or Firm* — Tom Wong; Jim Ross; Micky Minhas

(57) ABSTRACT

Real time collaboration is enabled by providing a notification to users attempting access to an item, such as a document or a resource, that another user has currently access to the item. The users may be notified automatically when the other user is done accessing the item or periodically as the item is being accessed by the other user. The notification(s) may also include a summary or complete list of changes such that any user accessing the item after the other user has the latest version.

16 Claims, 6 Drawing Sheets

(56) References Cited

U.S. PATENT DOCUMENTS

2010/0144444 A1* 6/2010 Graham .................. 463/42
2010/0169269 A1* 7/2010 Chandrasekaran ........... 707/608
2011/0294490 A1* 12/2011 Faenger ................. 455/419
2012/0096394 A1* 4/2012 Balko et al. ................. 715/790

OTHER PUBLICATIONS

Bailor, Jonathan., "Co-authoring (i.e. Simultaneous Editing) in Word 2010", Retrieved at << http://blogs.msdn.com/b/microsoft_office_word/archive/2009/09/09/co-authoring-in-word-2010.aspx >>, Sep. 9, 2009, pp. 4.

Downes, Stephen., "Synchronous collaborative text document editing online: moonedit", Retrieved at << http://www.masternewmedia.org/news/2005/02/20/synchronous_collaborative_text_document_editing.htm >>, Retrieved Date: Sep. 6, 2010, pp. 9.

Haake, et al., "Collaborative authoring of hypermedia documents.", Retrieved at << http://www.pi6.fernuni-hagen.de/publ/MT-93.pdf >>, 1993, pp. 18.

Parr, Ben., "Google docs adds major new features", Retrieved at << http://mashable.com/2010/04/12/google-docs-editor-features >>, Retrieved Date: Sep. 6, 2010, pp. 2.

* cited by examiner

IN BROWSER REAL TIME COLLABORATION LISTS AND FORMS

BACKGROUND

With the proliferation of networked computing and software in all aspects of work and personal life, collaborative services are becoming increasingly popular. In work environments, documents, computing resources, and comparable resources are shared and collaboratively utilized by any number of users. A similar collaboration can also be found in personal computer usage through social networking sites, online services, etc.

While many applications exist that enable users to participate in a "quasi-collaborative" environment, a true collaborative environment with real time sharing and cooperation remains elusive. For example, document sharing service enable users to retrieve, edit, and save documents from a networked resource and allow multiple users to have access to the same document. Changes made by one user to a document while others are working on the same document are not apparent to the other users in real time however, which may lead to degradation of user experience with multiple versions of the same document being created in the end. Alternatively, a shared document may be "locked" for a user and others not allowed to make changes on the original version until that user is done. This approach also defeats the purpose of a collaborative environment.

Thus, users are commonly forced to use external communication means to notify each other (e.g., instant messaging, audio communication, etc.) that one is making changes to an item in a collaborative environment, which brings into question whether the environment is truly collaborative or not.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling real time collaboration by notifying users attempting access to an item such as a document or a resource that another user has currently access to the item. According to some embodiments, the users may be notified automatically when the other user is done accessing the item. The notification may also include a summary or complete list of changes such that any user accessing the item after the other user has the latest version. Furthermore, real time updates on the changes may also be provided to the users as the other user is still working on the item.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
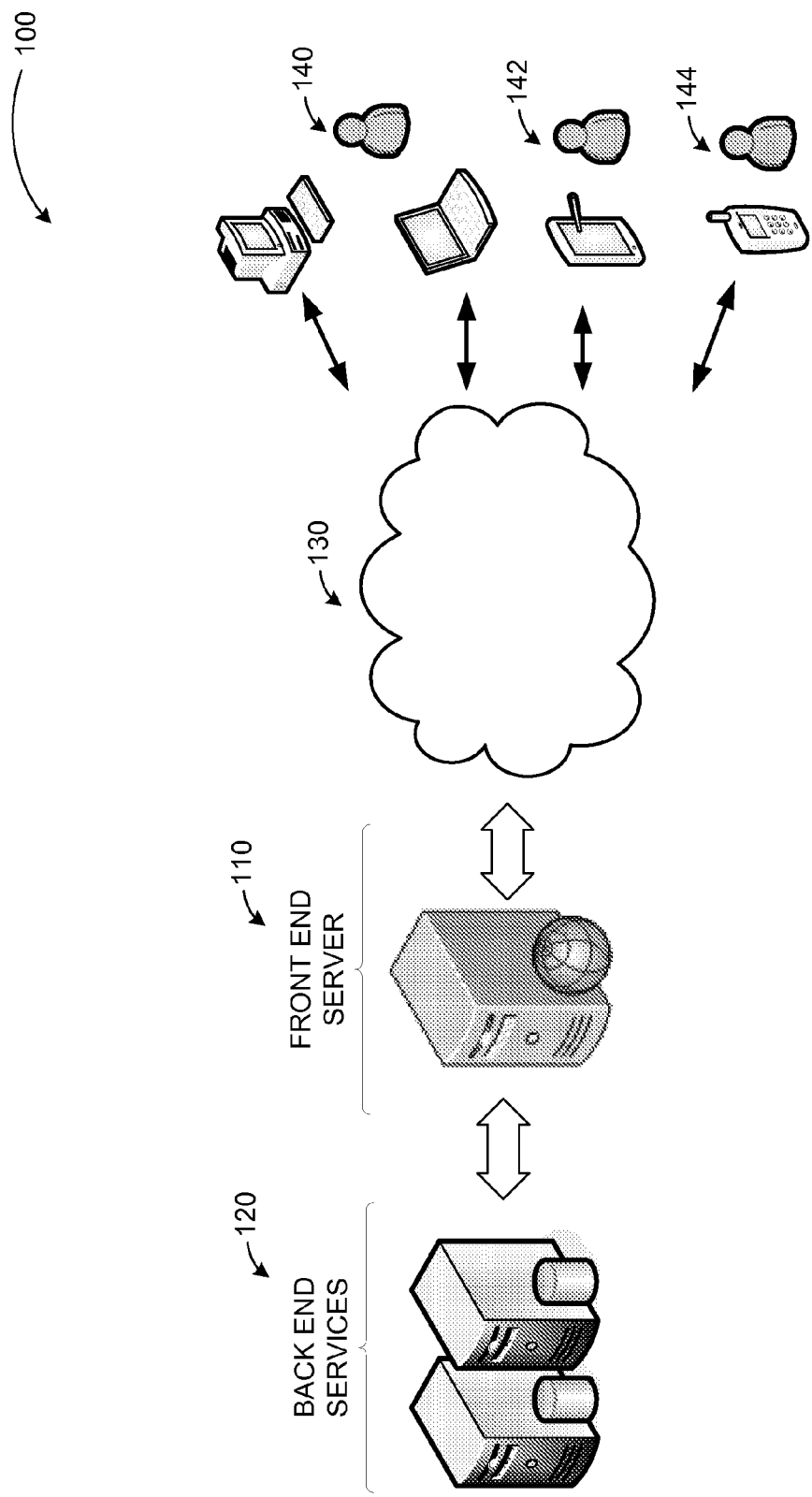
FIG. 1 is a diagram illustrating example components of a networked system providing a collaborative environment.

As briefly described above, real time collaboration may be enabled by notifying users attempting access to an item that another user has currently access to the item. The users may be notified again automatically when the other user is done accessing the item or periodically as the user is still accessing the item. The notification(s) may also include a summary or complete list of changes such that any user accessing the item after the other user has the latest version. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for managing collaboration services in a networked environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of a networked system providing a collaborative environment. A collaborative service executed on front end server 110, as shown in diagram 100, may include one or more applications providing a range of services to users 140, 142, 144, and so on.

Users 140, 142, 144 may access the service through a variety of client devices, such as a desktop computer, a laptop computer, a personal digital assistant (PDA) device, a tablet, a mobile computer, and handheld computer, and a smartphone, and applications such as locally installed rich client applications or generic web browsers. The collaborative service may enable users to create, share, edit, and otherwise utilize a variety of items. For example, a co-authoring service may enable users to create, share, and edit word processing documents, spreadsheets, presentation documents, calendars, textual and/or graphical communications (e.g. email), graphical files (e.g. images or drawing documents), audio files, video files, and comparable ones.

A collaborative service may also manage shared usage of a resource such as a computing resource, a communication resource, an output resource, and the like. Front end server 110 may facilitate communications with the client devices via network 130, authenticate users, provide requested data, and so on. Resource-intensive or large amounts of data requiring processes may be performed by one or more back end service servers 120.

According to one example implementation, the collaborative service may be a document sharing service executed at the front end server 110, where data storage, data mining, and similar processes are managed by back end services 120. In a collaborative environment, information associated with changes being made to items may determine whether the system works and how its users perceive a quality of service. For example, if the collaborative service "locks" an item as long as a user is accessing it, other users may get frustrated because it is not a true collaboration. On the other hand, if no tracking or notification mechanism is implemented, simultaneous changes to the items may create confusion.

In a system according to embodiments, a channel based notification mechanism alerts other users when a particular user is accessing an item and/or making changes to it. The system also notifies the other users, when the accessing user is done and what changes have been made. This may enable the other users to postpone their changes, view what has been done to the item, and determine their actions. The notifications provided by the front end server 110 to the client devices may be used by the client applications in a variety of ways. For example, some applications may be configured to disable certain access/edit features as long as another user is accessing the item. Other applications may present the information in conjunction with the list view (or other view) such as highlighting the accessed item, highlighting change information, presenting the change information in a different user interface, etc. Of course, other configurations may also be used to implement a real time collaborative service with different servers, clients, and other devices and applications.

Figure 2:
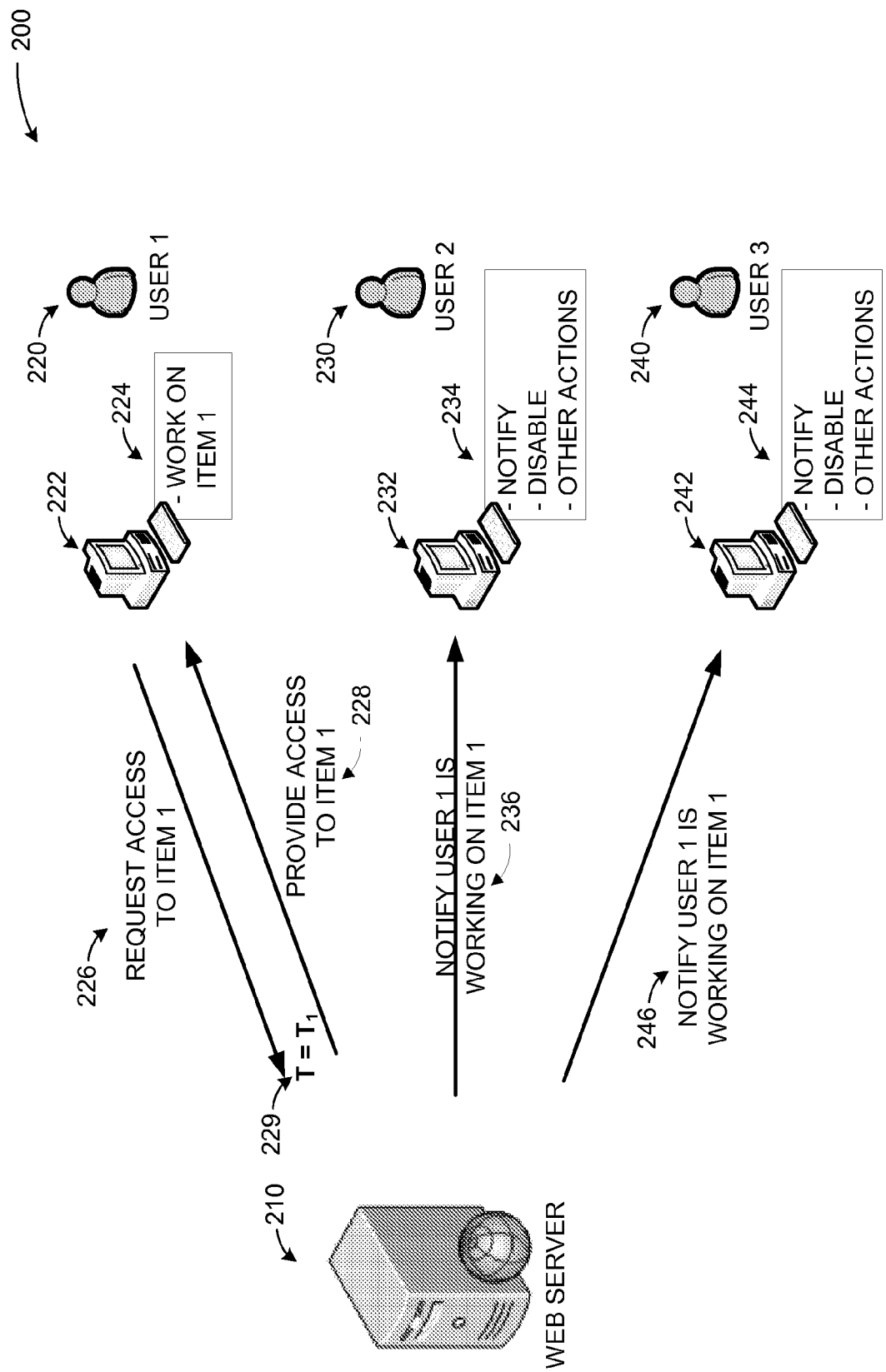
FIG. 2 illustrates example interactions in notifying users about an item currently being accessed by another user.

FIG. 2 illustrates example interactions in notifying users about an item currently being accessed by another user. In the example scenario presented by diagram 200, web server 210 may provide a collaborative service such as a document sharing service. A user (user 1) 220 may submit a request for accessing an item (226) through a client application executed on their computing device 222. $T=T_1$ (229) denotes a time of the request (as the first request). In response server 210 may provide access to the item (228) enabling the user 220 to make changes to the item, among other things (224).

While user 220 is working on the item, web server 210 may send notifications (236, 246) through a channel to users 230 and 240 that user 220 currently has access to the item. Users 230 and 240 may be connecting to the collaborative service through a browser or other client application executed on computing devices 232 and 242, respectively, which upon receiving the notifications may notify the users, disable certain functionalities (e.g. editing of a document that is currently being edited by user 220), or perform other actions (234, 244). The client applications (or browsers) may be enabled to present the notifications through a variety of textual, graphical, color, or shading schemes. For example, the item accessed by user 220 may be highlighted in a particular manner on the list presented to the users 230 and 240.

Thus, users 230 and 240 realizing that the item may be undergoing changes may wait before accessing it, perform other operations, etc. The notifications may include an identifier of the item (e.g. a file name), an identification of user 220, a time/date of user 220's access to the item, and similar information. A similar interaction may take place is user 220 creates a new item on the shared list.

Figure 3:
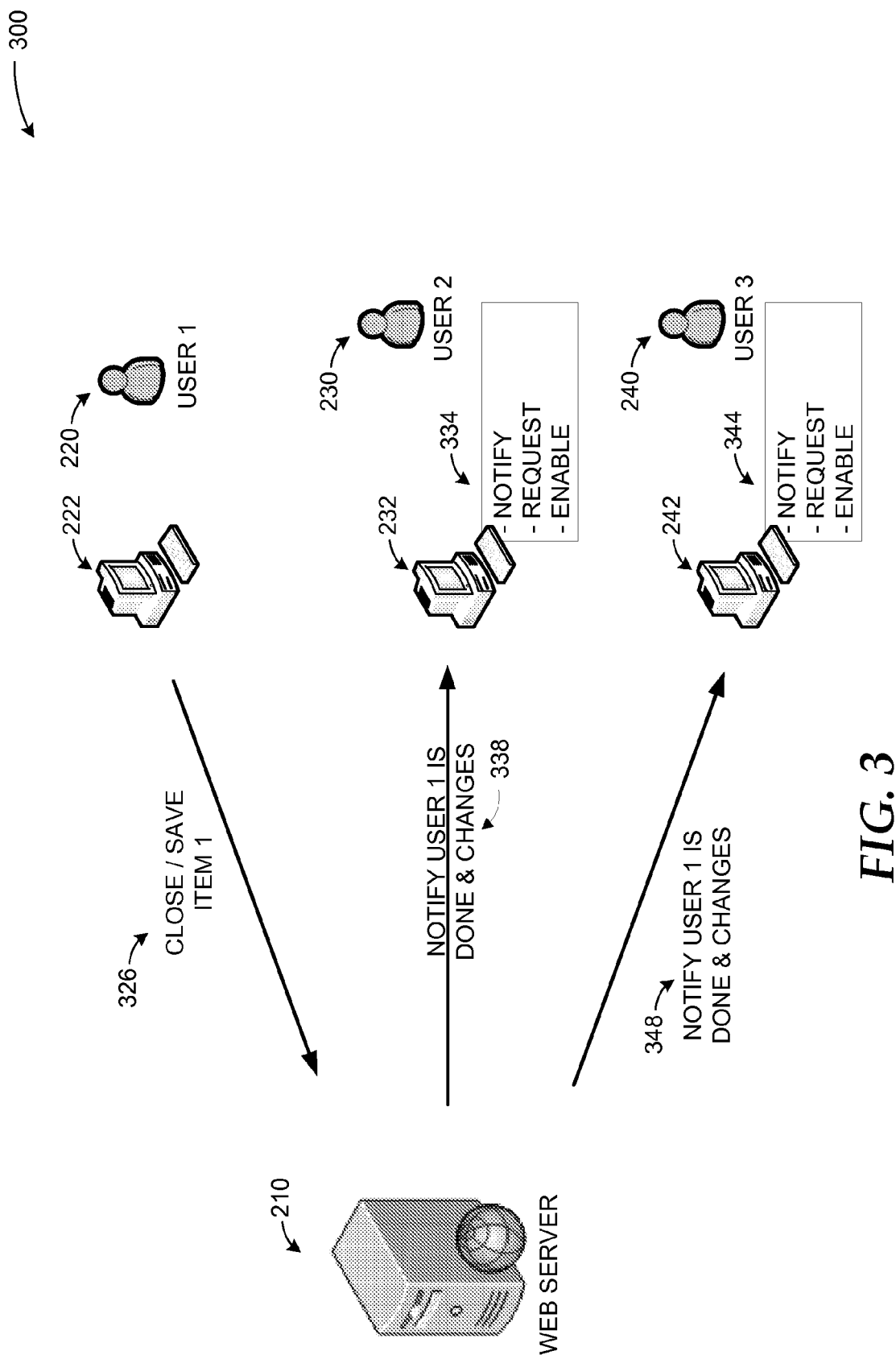
FIG. 3 illustrates example interactions in notifying the user following the other user's completion of their access to the item, as well as any changes made to the item.

FIG. 3 illustrates example interactions in notifying the user following the other user's completion of their access to the item, as well as any changes made to the item. Diagram 300 illustrates a second phase of the example scenario shown in diagram 200 of FIG. 2.

According to the example scenario in diagram 300, user 220 connecting to web server 210 through their computing device 222, saves or closes the accessed item (326). In response, web server 210 may transmit notifications (338, 348) to users 230 and 240 over the same channel that include information associated with the fact that user 220 is done with the item, the item's identifier, the user's identity, time/date of the transaction, any changes made by user 220, and comparable data. The notifications may be communicated to the users 230 and 240 employing a proprietary or standard communication protocol, for example, using a Hypertext Markup Language (HTML) web-socket service through a Transmission Control Protocol/Internet Protocol (TCP/IP) socket on a dynamic port.

Client applications or browsers executed on computing devices 232 and 242 may notify users 230 and 240, respectively, enable the users to request access to the item, enable the users to make changes to the item, and so on (334, 344), in response to receiving the notifications from web server 210.

Thus, client applications for the users 230 and 240 may receive state information associated with the item of interest without actively checking the item periodically or on-demand. Instead, web server 210 notifies the client applications, which can consume the notification information as configured. Moreover, the notifications may also be sent periodically or following each change as user 220 is making those changes.

The systems and implementations of real time collaboration services discussed above are for illustration purposes and do not constitute a limitation on embodiments. Embodiments may be implemented employing other modules, processes, and configurations using the principles discussed herein.

Figure 4:
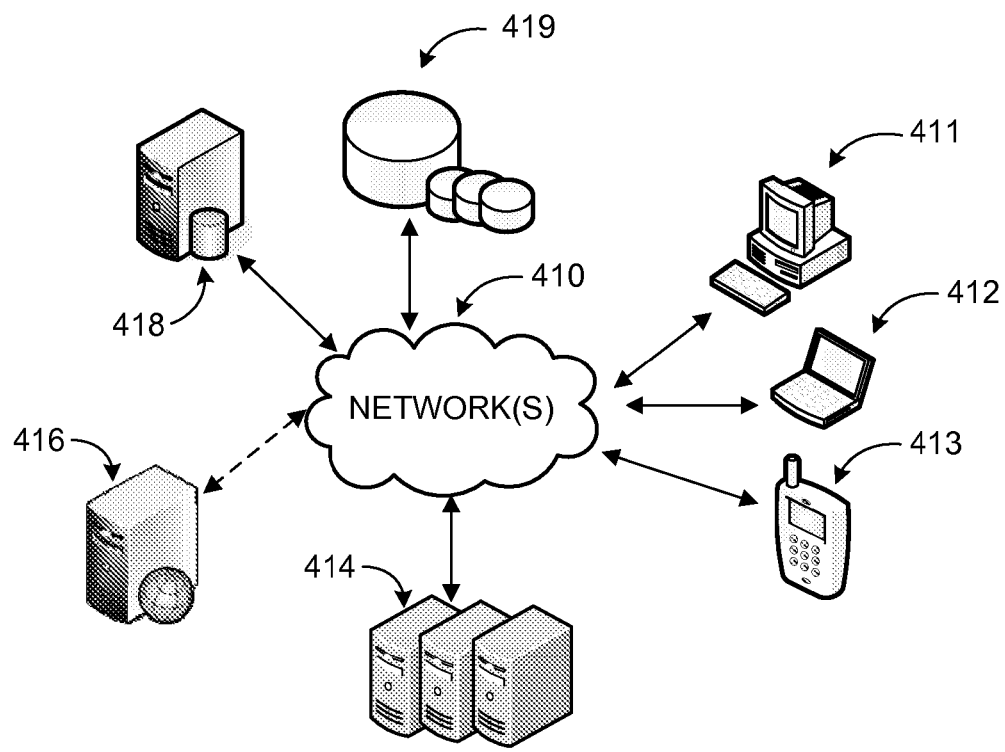
FIG. 4 is a networked environment, where a system according to embodiments may be implemented.

FIG. 4 is an example networked environment, where embodiments may be implemented. A real time collaboration application may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

As discussed above, a collaboration application executed on servers 414 or 416 may record a user visiting a specific list as 'online' for that list, which constitutes a channel. Subsequently, if the user opens an item from the list, the collaboration application may notify other users by broadcasting this on that channel. When the user saves an item to the list (or changes to the accessed item), the application may broadcast the new/updated item to the other users on the same channel.

On the client side, the user's browser executed on one of the client devices 411-413 may connect to the channel for a visited list. If there are other users and they open an item, the current user may receive a message from the collaboration application indicating which items are open, and who opened them. If there are other users and they save an item, the current user may receive a message from the collaboration application indicating which item was saved, who saved it, and when it was saved. The user's browser may reflect these state changes for items on the user interface in a variety of ways.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to aggregate structured and unstructured project information. Furthermore, the networked environments discussed in FIG. 4 are for illustration purposes only. Embodiments are not limited to the example applications, modules, or processes.

Figure 5:
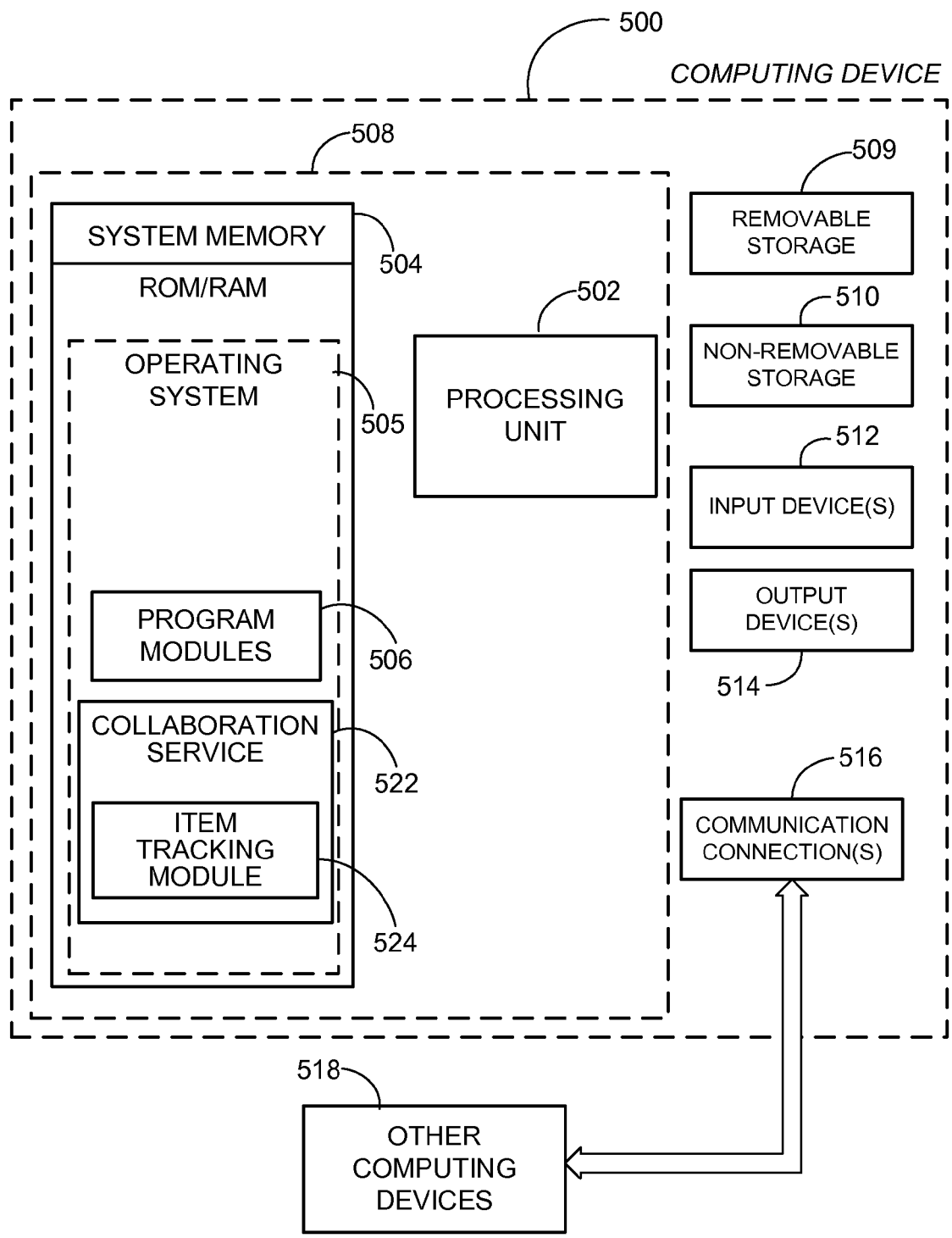
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server that provides collaborative services to clients and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, collaborative service 522, and item tracking module 524.

Collaborative service 522 may enable users to create, share, edit, and remove documents of various types (e.g., word processing documents, spreadsheets, graphical documents, audio files, video files, etc.) or other items by presenting structured/organized lists of the items/documents such that users can visit a list, select an item/document from the list, and access the item/document. Users may connect to the collaborative service through a specialized user interface or a generic application such as a browser. Item tracking module 524 may be an integrated part of collaborative service 522 of a separate application and notify users if another user is currently accessing an item/document. Item tracking module 524 may also notify other users when the other user is finished with the item/document or created a new item/document providing details like changes, time & date, the creating/editing user's identity, etc. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
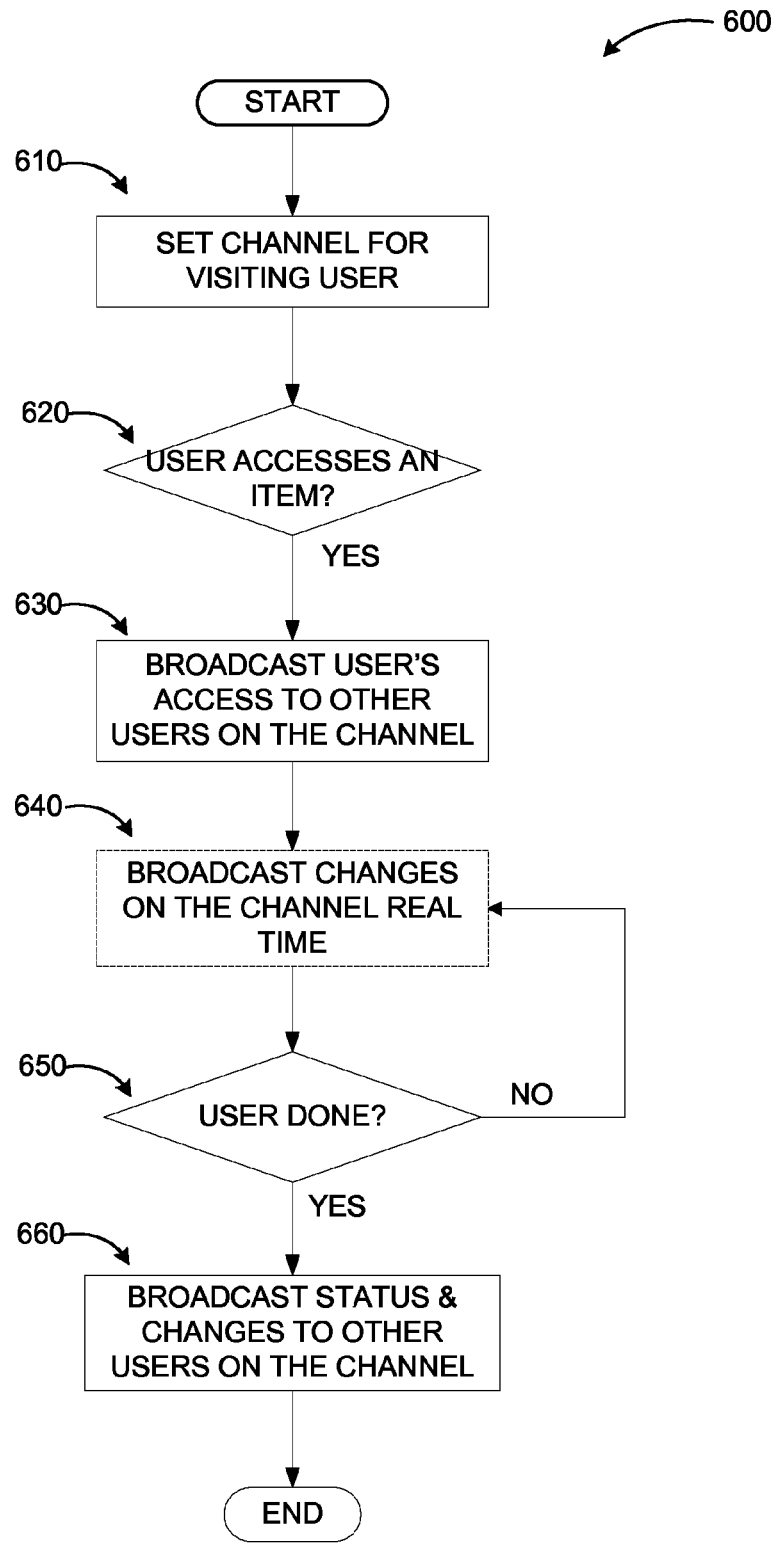
FIG. 6 illustrates a logic flow diagram for a process of real time collaboration through notification according to embodiments.

FIG. 6 illustrates a logic flow diagram for process 600 of real time collaboration through notification according to embodiments. Process 600 may be implemented by a server in a collaborative service environment.

Process 600 begins with operation 610, where a channel is set at the collaboration server associated with a user visiting a specific list of items. According to some embodiments, the server may utilize a TCP/IP socket using a web-socket service on a dynamic port. Next, a determination may be made at decision operation 620 whether the user accesses (opens) an item on the list or not. If the user accesses the item, processing continues to operation 630, where the user's access of the item is broadcast to other users through the channel. The broadcast information may include the user's identity, the item's identifier, a time/date of access, etc.

At optional operation 640, the collaboration server may further broadcast any changes made to the item by the accessing user in real time. This optional operation may be performed periodically broadcasting the changes in the last period or following each change depending on system configuration.

At decision operation 650, a determination is made whether the user is done with the accessed item or not. If the user is done, processing may continue to operation 660, where another broadcast is made through the channel notifying the other users that the item is now available, any changes to the item, a time/date of the changes, the last user's identity, etc. Similarly, if a user creates a new item on the list, users associated with the list may be notified through the channel about the newly created item.

The operations included in process 600 are for illustration purposes. Real time collaboration through notification according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for real time collaboration utilizing shared items, the method comprising:
    detecting an interest of a user on a list of items by one of:
        detecting an activation by the user of a view screen presenting the list and detecting a hovering by the user over the presented list;
    in response to detecting the interest of the user on the list of items, setting a channel for the list at a collaboration server executed on a front end server accessed through one of a web browser and a locally installed rich client application on a client device including one or more of: a desktop computer, a laptop computer, a personal digital assistant (PDA) device, a tablet, a mobile computer, and handheld computer, and a smartphone;
    receiving a request to provide an access to an item from the list of items;
    providing the access to the user;
    one of periodically broadcasting the user's access to the item to other users associated with the list over the channel and broadcasting the user's access to the item to the other users associated with the list over the channel following each change made to the accessed item, wherein broadcasting the user's access includes notifying when the user is accessing the item and when changes are made to the accessed item by one or more of: highlighting the accessed item, highlighting a change made to the accessed item, and presenting a change made to the accessed item in a separate user interface;
    transmitting state information associated with the item over the channel using one or more notifications to enable the other users to receive state information associated with the item without actively checking the item periodically or on-demand, including sending a message to the other users on the channel when the user accesses the item, wherein the message indicates which item is open, which user opened the item, which item was saved, which user saved the item, and when the item was saved; and
    in response to detecting a completion of the user's access to the item, wherein the completion is detected based on a save and a close of the item, broadcasting the completion of the access to the other users over the channel.

2. The method of claim 1, further comprising:
    initiating a Transmission Control Protocol/Internet Protocol (TCP/IP) socket using a Hypertext Markup Language (HTML) web-socket service at server start.

3. The method of claim 1, wherein broadcasting the user's access to the item includes broadcasting at least one from a set of: an identity of the user, an identifier of the item, and a time/date of access.

4. The method of claim 1, wherein broadcasting the completion of the access includes broadcasting at least one from a set of: an identity of the user, an identifier of the item, changes made to the item, and a time/date of completion of the changes.

5. The method of claim 1, further comprising:
    in response to detecting a creation of a new item in the list by the user, broadcasting the new item to the other users over the channel.

6. The method of claim 1, wherein the item includes at least one from a set of: a document, a file, a computational resource, and an output resource.

7. The method of claim 6, wherein providing access to the item includes enabling the user to at least one from a set of: create, share, and edit the item.

8. A collaboration server providing a collaborative service, the server comprising:
    a memory;
    a processor coupled to the memory, the processor executing at least one application associated with the collaborative service in conjunction with instructions stored in the memory, wherein the collaborative service is configured to:

authenticate a user at a front end server associated with the collaborative service, wherein the front end server is configured to facilitate communications with one or more client devices over a network, and to provide requested data over the network, and wherein a back-end server associated with the collaborative service is configured to perform data storage and data mining processes;

detect an interest of the user on a list of items by one of: detecting an activation by the user of a view screen presenting the list and detecting a hovering by the user over the presented list;

in response to detecting the interest of the user on the list of items, set a channel for the list at the collaboration server;

receive a request to provide an access to an item from the list of items;

provide the access to the user;

one of periodically broadcast the user's access to the item to other users associated with the list over the channel at the front end server and broadcast the user's access to the item to the other users associated with the list over the channel following each change made to the accessed item, wherein the broadcast of the user's access includes notifying when the user is accessing the item and when changes are made to the accessed item by one or more of: highlighting the accessed item, highlighting a change made to the accessed item, and presenting a change made to the accessed item in a separate user interface;

in response to detecting a completion of the user's access to the item, broadcast the completion of the access to the other users over the channel at the front end server using one or more notifications to enable the other users to receive state information associated with the item without actively checking the item periodically or on-demand; and in response to detecting a creation of a new item in the list by the user, broadcast the new item to the other users over the channel at the front end server.

9. The server of claim 8, wherein the collaborative service is accessible by one of a client application and a browser application.

10. The server of claim 8, wherein the collaborative service is further configured to enable a client application to one of: notify a user and disable a functionality in response to receiving the broadcast from the server.

11. The server of claim 10, wherein the collaborative service is further configured to enable the client application to present a broadcast information through at least one from a set of: a textual, a graphical, a color, and a shading scheme on list view.

12. The server of claim 8, wherein the collaborative service is further configured to enable the user to one of: share, edit, and create the item that includes at least one from a set of: a document, a file, a computational resource, and an output resource.

13. The server of claim 8, wherein the server is configured to initiate a Transmission Control Protocol/Internet Protocol (TCP/IP) socket using a Hypertext Markup Language (HTML) web-socket service on a dynamic port at server start.

14. A computer-readable memory device with instructions stored thereon for real time co-authoring service, the instructions comprising:

initiating a Transmission Control Protocol/Internet Protocol (TCP/IP) socket using a Hypertext Markup Language (HTML) web-socket service;

authenticating a user at a front end server associated with a collaboration server, wherein the user is enabled to access the collaboration server via a specialized user interface;

detecting an interest of the user on a list of items by one of: detecting an activation by the user of a view screen presenting the list and detecting a hovering by the user over the presented list;

in response to detecting the interest of the user on the list of documents, setting a channel for the list at the front end server associated with the collaboration server;

receiving a request to provide an access to a document from the list of documents;

providing the access to the user;

one of periodically broadcasting the user's access to the document to other users associated with the list over the channel using a TCP/IP socket via an item tracking module integrated with the collaboration server and broadcasting the user's access to the item to the other users associated with the list over the channel following each change made to the accessed item, wherein broadcasting the user's access includes notifying when the user is accessing the item and when changes are made to the accessed item by one or more of: highlighting the accessed item, highlighting a change made to the accessed item, and presenting a change made to the accessed item in a separate user interface;

periodically transmitting state information associated with the document over the channel using one or more notifications to enable the other users to receive state information associated with the item without actively checking the item periodically or on-demand, wherein the state information includes periodic notifications following each change made to the document by the user as the user is actively making changes to the document and wherein transmitting the state information includes sending a message to other users on the channel when the user accesses the item, wherein the message indicates which item is open, which user opened the item, which item was saved, which user saved the item, and when the item was saved;

in response to detecting a creation of a new document providing details in the list by the user, broadcasting the new document to the other users over the channel via the item tracking module; and in response to detecting a completion of the user's access to the document, broadcasting the completion of the access to the other users over the channel via the item tracking module.

15. The computer-readable memory device of claim 14, wherein the document includes at least one from a set of: a word processing document, a spreadsheet, a presentation document, a calendar, a textual communication, a graphical communications, a graphics file, an image file, an audio file, and a video file.

16. The computer-readable memory device of claim 14, wherein the access to the document is provided through one of client application and a browser application that are enabled to one of notify the other users and disable at least one functionality associated with editing the document in response to receiving the broadcast of the user's access to the document.

* * * * *